US010730177B2

(12) United States Patent
Liu

(10) Patent No.: US 10,730,177 B2
(45) Date of Patent: Aug. 4, 2020

(54) TOOL CABINET

(71) Applicant: Chia-Ming Liu, Douliou (TW)

(72) Inventor: Chia-Ming Liu, Douliou (TW)

( * ) Notice: Subject to any disclaimer, the term of this patent is extended or adjusted under 35 U.S.C. 154(b) by 0 days.

(21) Appl. No.: 16/297,518

(22) Filed: Mar. 8, 2019

(65) Prior Publication Data

US 2020/0171646 A1     Jun. 4, 2020

(30) Foreign Application Priority Data

Nov. 30, 2018   (CN) ..................... 2018 2 2005551 U

(51) Int. Cl.
| | |
|---|---|
| *B25H 1/12* | (2006.01) |
| *B25H 1/16* | (2006.01) |
| *B65H 75/48* | (2006.01) |
| *H02G 11/02* | (2006.01) |
| *H02G 3/22* | (2006.01) |
| *H01R 13/72* | (2006.01) |
| *H01R 13/516* | (2006.01) |
| *H01R 13/74* | (2006.01) |
| *H01R 103/00* | (2006.01) |
| *H01R 25/00* | (2006.01) |
| *H01R 24/28* | (2011.01) |

(52) U.S. Cl.
CPC ................ *B25H 1/12* (2013.01); *B25H 1/16* (2013.01); *B65H 75/486* (2013.01); *H01R 13/516* (2013.01); *H01R 13/72* (2013.01); *H01R 13/74* (2013.01); *H02G 3/22* (2013.01); *H02G 11/02* (2013.01); *B65H 2701/34* (2013.01); *H01R 24/28* (2013.01); *H01R 25/006* (2013.01); *H01R 2103/00* (2013.01)

(58) Field of Classification Search
None
See application file for complete search history.

(56) References Cited

U.S. PATENT DOCUMENTS

| | | | | |
|---|---|---|---|---|
| 3,999,640 | A * | 12/1976 | Persson ..................... | A47L 9/26 |
| | | | | 191/12.4 |
| 4,373,761 | A * | 2/1983 | Hansberry, Jr. .......... | B25H 5/00 |
| | | | | 182/132 |
| 4,429,931 | A * | 2/1984 | Brooks .................. | B65H 75/36 |
| | | | | 312/228 |
| 4,976,450 | A * | 12/1990 | Ellefson .................... | A47F 5/05 |
| | | | | 108/103 |
| 5,429,431 | A * | 7/1995 | Olson ................... | A47B 21/06 |
| | | | | 108/23 |
| 8,608,260 | B2 * | 12/2013 | Wishlade ................. | B25H 1/12 |
| | | | | 312/319.8 |

(Continued)

*Primary Examiner* — Hanh V Tran
(74) *Attorney, Agent, or Firm* — DLA PIPER LLP (US)

(57) ABSTRACT

A tool cabinet includes a cabinet body, a plurality of storage members, an input device, and an output device. The cabinet body has first and second openings. The input device includes a cord winder and a power cord. The power cord has a plug portion exposed from the first opening, and a cord portion connected between the cord winder and the plug portion. At least a portion of the cord portion is pulled out of the first opening when the plug portion is moved to a non-retracted position. The cord winder includes a resilient member for biasing the plug portion toward a retracted position. The output device includes a power strip electrically connected to the power cord, and having a plurality of sockets that is exposed from the second opening.

9 Claims, 13 Drawing Sheets

(56) References Cited

U.S. PATENT DOCUMENTS

| | | | |
|---|---|---|---|
| 9,136,684 B2* | 9/2015 | Giles | H02G 11/02 |
| 9,516,946 B1* | 12/2016 | Edwards | A47B 83/045 |
| 9,815,189 B1* | 11/2017 | Liu | B25H 1/16 |
| 9,849,584 B1* | 12/2017 | Liu | B25H 3/027 |
| 2009/0260547 A1* | 10/2009 | Epstein | A47B 37/00 |
| | | | 108/50.02 |
| 2014/0265753 A1* | 9/2014 | Soper | A47B 21/06 |
| | | | 312/22 |
| 2017/0258223 A1* | 9/2017 | Stampler | A47B 81/005 |

* cited by examiner

TOOL CABINET

CROSS-REFERENCE TO RELATED APPLICATION

This application claims priority of Chinese Patent Application No. 201822005551.3, filed on Nov. 30, 2018.

FIELD

The disclosure relates to a tool cabinet, and more particularly to a tool cabinet having a cord winder.

BACKGROUND

A conventional tool cabinet commonly used for storing tools provides organizational benefits and ease of access to tools in various working areas. Since not all working areas have immediate access to electric power such as a wall socket, in order to have access to electric power for operating certain power tools, extension cords are used as power connections. To ensure that the extension cords remain functional throughout the whole operation of the power tools, deployment and maintenance of the extension cords require coordination among the workers. Oftentimes, the workers may easily forget about the position where the extension cords were last placed, resulting in a relatively inefficient working process.

SUMMARY

Therefore, the object of the disclosure is to provide a tool cabinet that can alleviate at least one of the drawbacks of the prior art.

A tool cabinet according to the disclosure includes a cabinet body, a plurality of storage members, an input device, and an output device.

The cabinet body has an external surface formed with first and second openings. The storage members are disposed in the cabinet body.

The input device includes a cord winder and a power cord. The cord winder includes a hollow casing, a rotating seat, and a resilient member. The hollow casing is disposed in the cabinet body, is spaced apart from the storage members, and has a cord hole that is in spatial communication with the first opening. The rotating seat is mounted in the casing and is rotatable about an axis. The resilient member is connected between the casing and the rotating seat. The power cord has a plug portion that is exposed from the first opening of the external surface, and a cord portion that is connected between the rotating seat of the cord winder and the plug portion, and that is wound about the axis onto the rotating seat of the cord winder.

The output device includes a power strip disposed in the cabinet body, electrically connected to the power cord, and having a plurality of sockets that are exposed from the second opening of the external surface.

The plug portion of the power cord is movable between a retracted position, where the plug portion is retracted in the cabinet body, and a non-retracted position, where at least a portion of the cord portion of the power cord is unwound from the rotating seat and is pulled out of the first opening via the cord hole of the casing. The resilient member is disposed for biasing the plug portion toward the retracted position.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
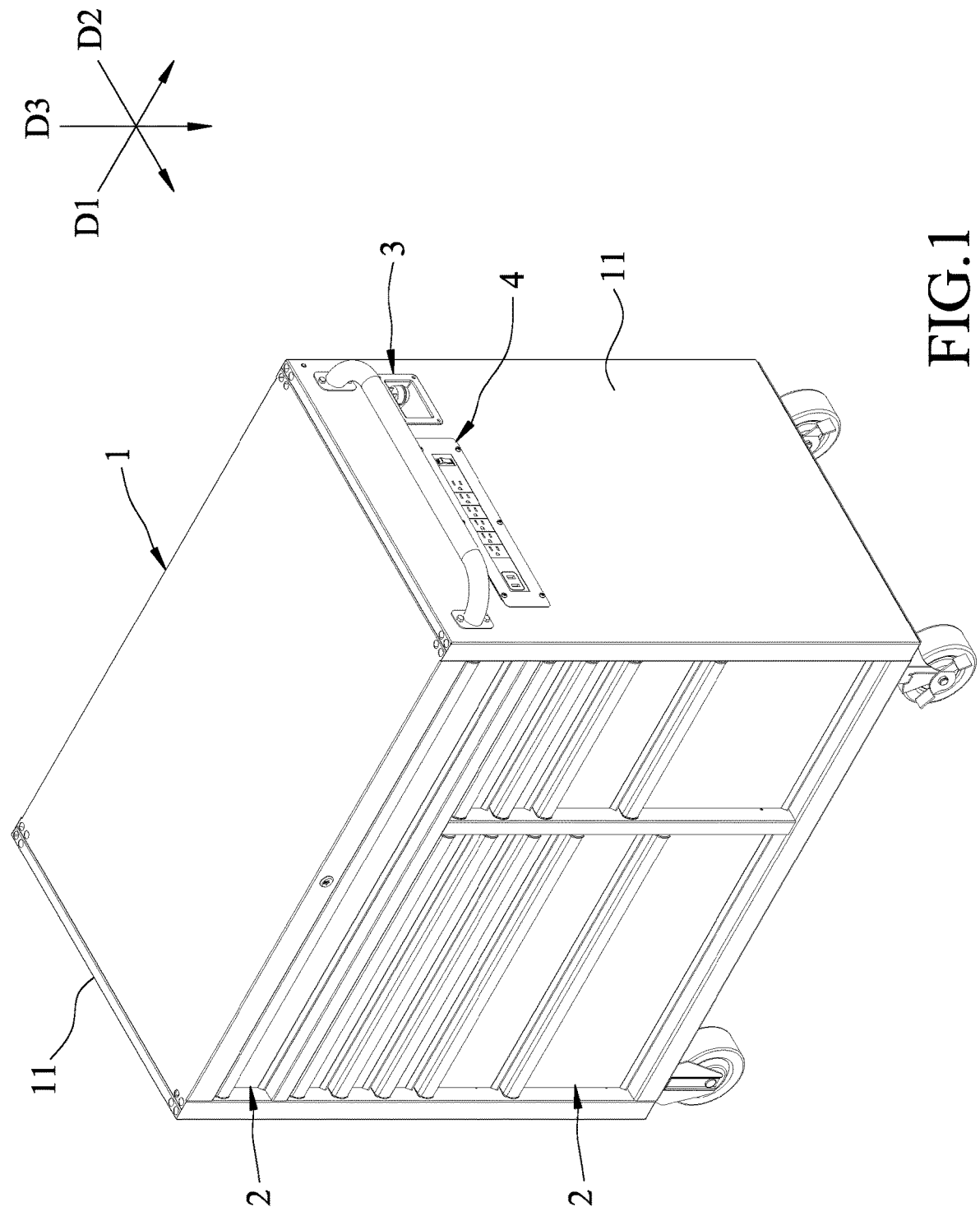
FIG. 1 is a perspective view of a first embodiment of a tool cabinet according to the present disclosure.

Before the present disclosure is described in greater detail, it should be noted that where considered appropriate, reference numerals or terminal portions of reference numerals have been repeated among the figures to indicate corresponding or analogous elements, which may optionally have similar characteristics.

Figure 2:
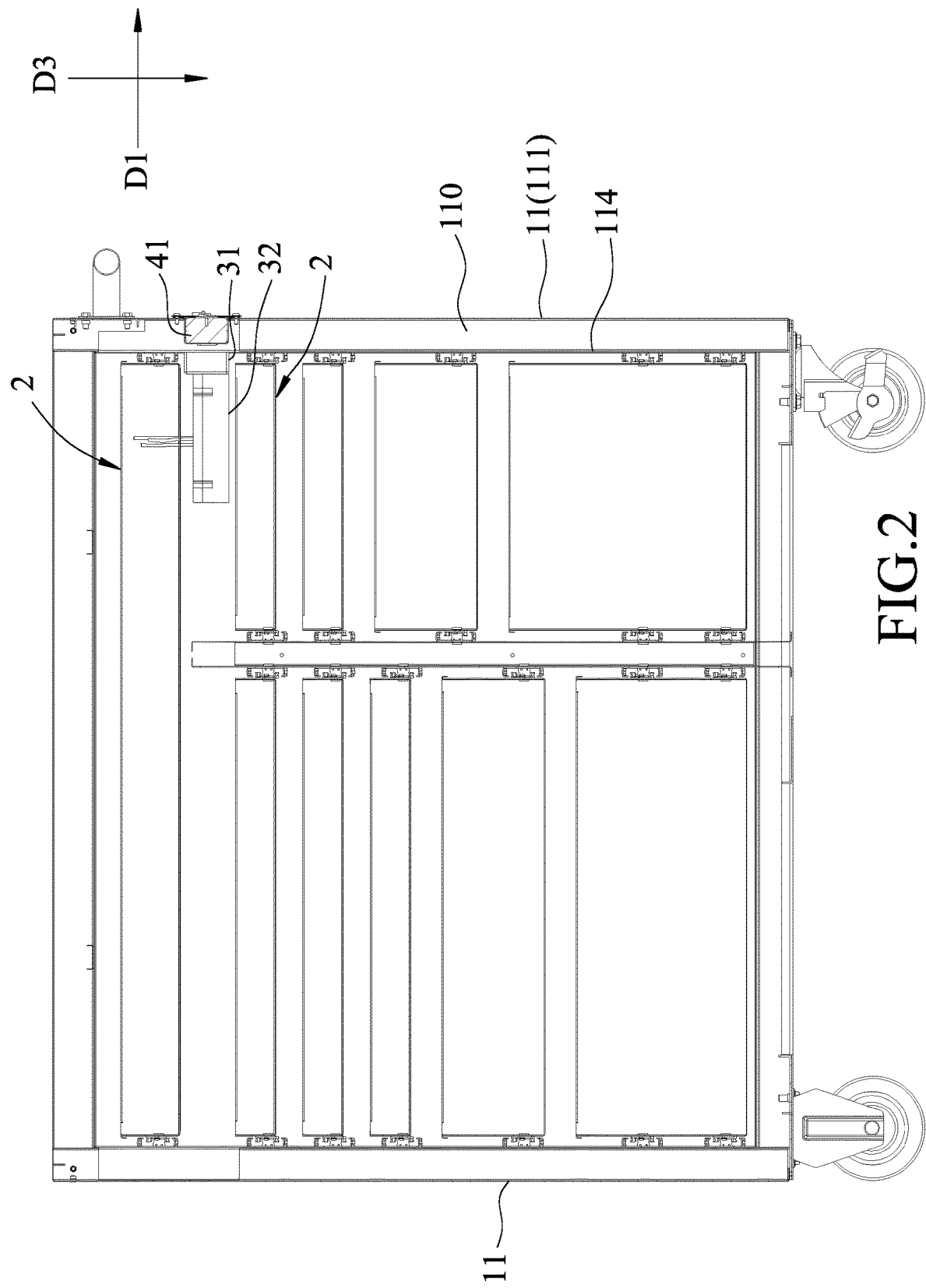
FIG. 2 is a sectional front view of the first embodiment.

Referring to FIGS. 1 and 2, a first embodiment of a tool cabinet according to the present disclosure includes a cabinet body 1, a plurality of storage members 2, an input device 3, and an output device 4.

Figure 3:
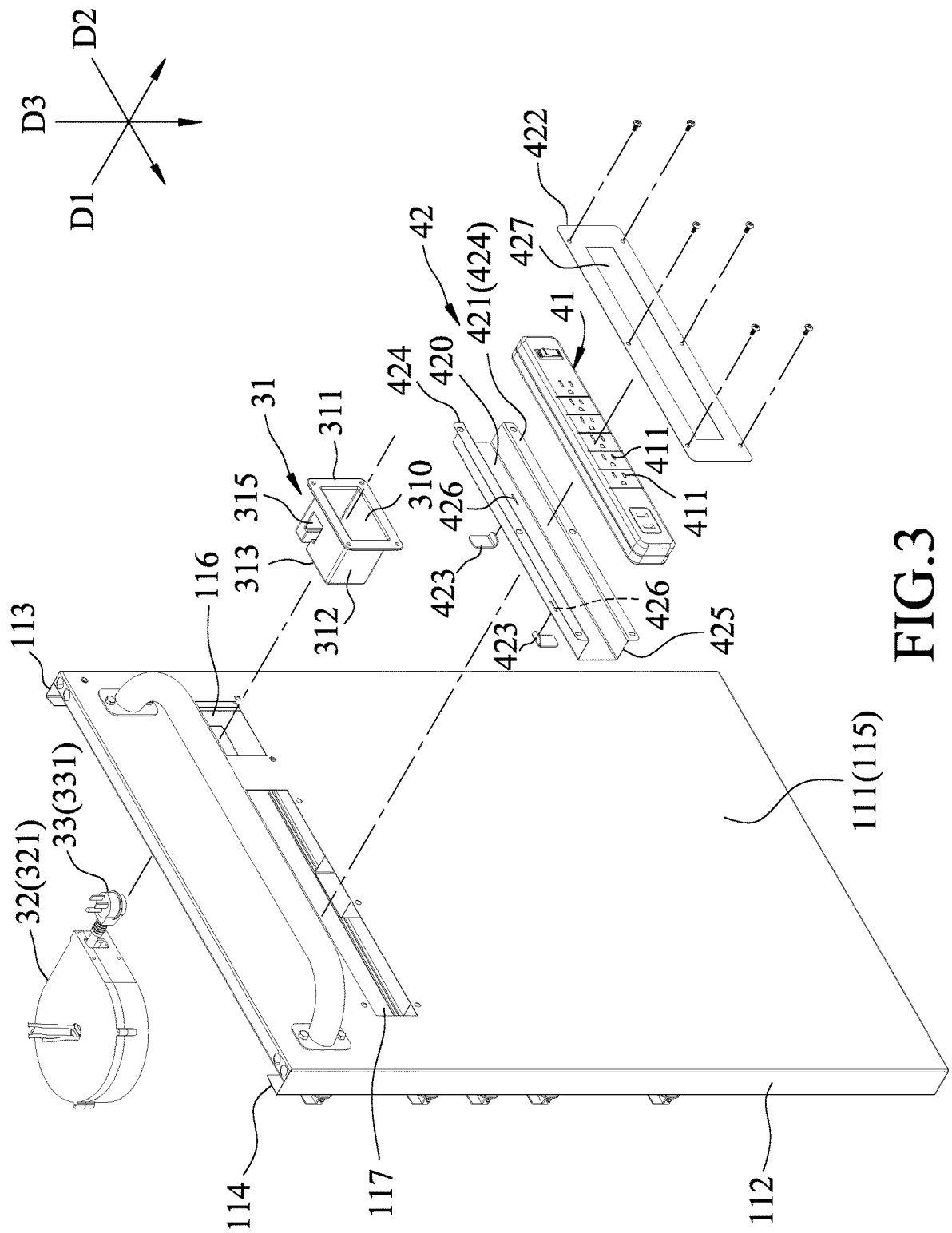
FIG. 3 is an exploded perspective view illustrating a side member, an input device and an output device of the first embodiment.
Figure 4:
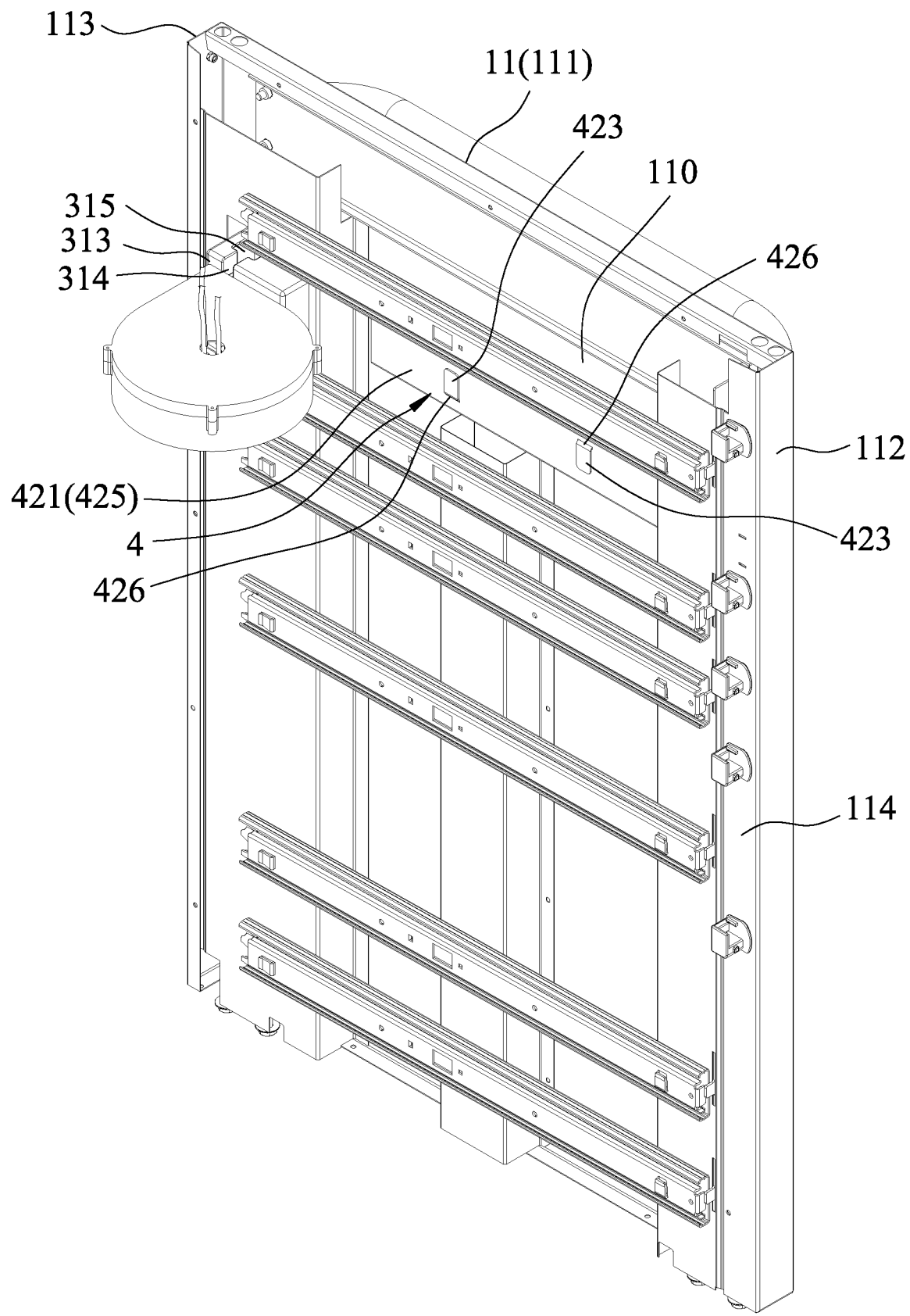
FIG. 4 is an assembled perspective view illustrating the side member, the input device and the output device of the first embodiment.
Figure 5:
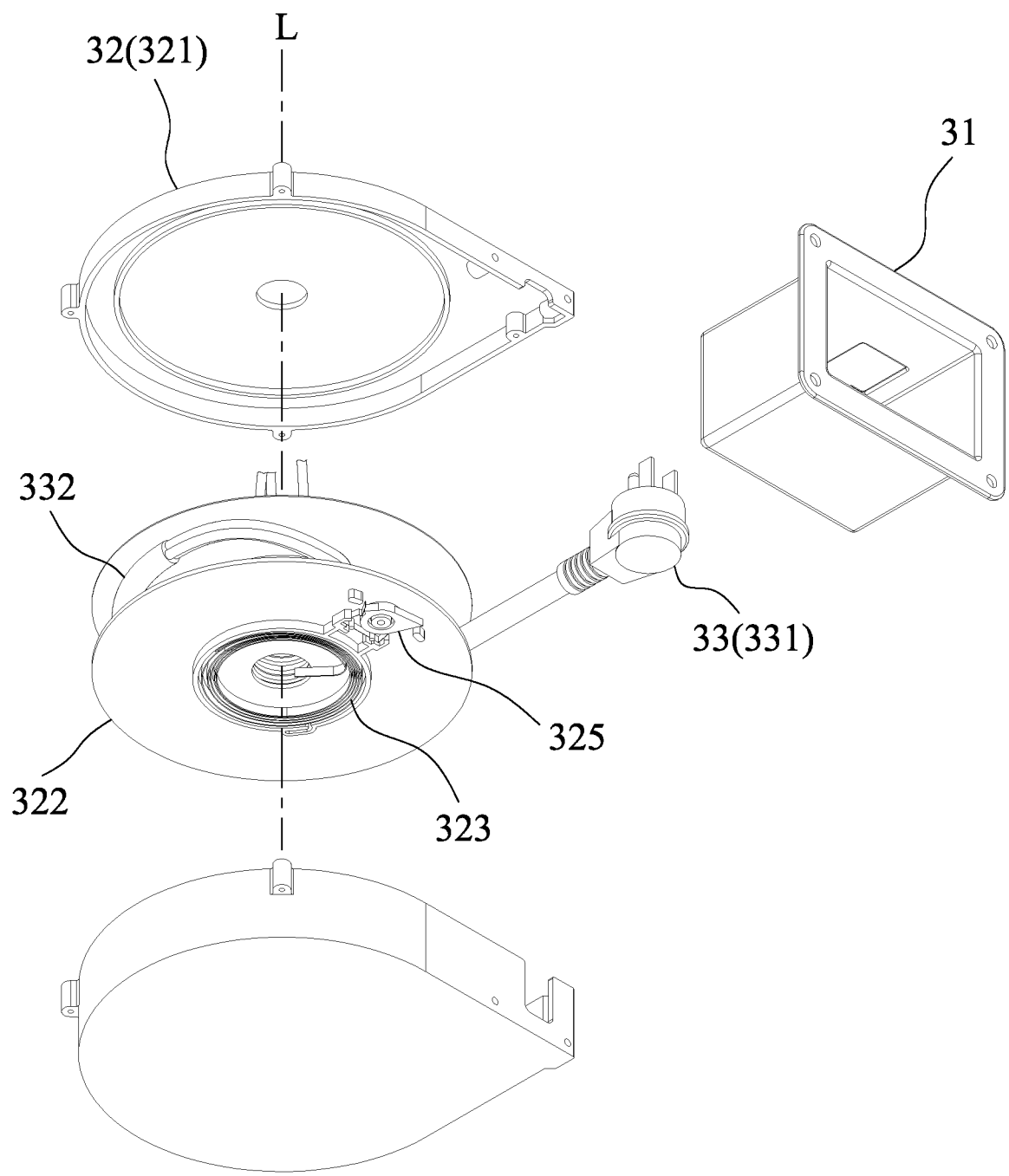
FIG. 5 is an exploded perspective view illustrating the input device of the first embodiment.
Figure 6:
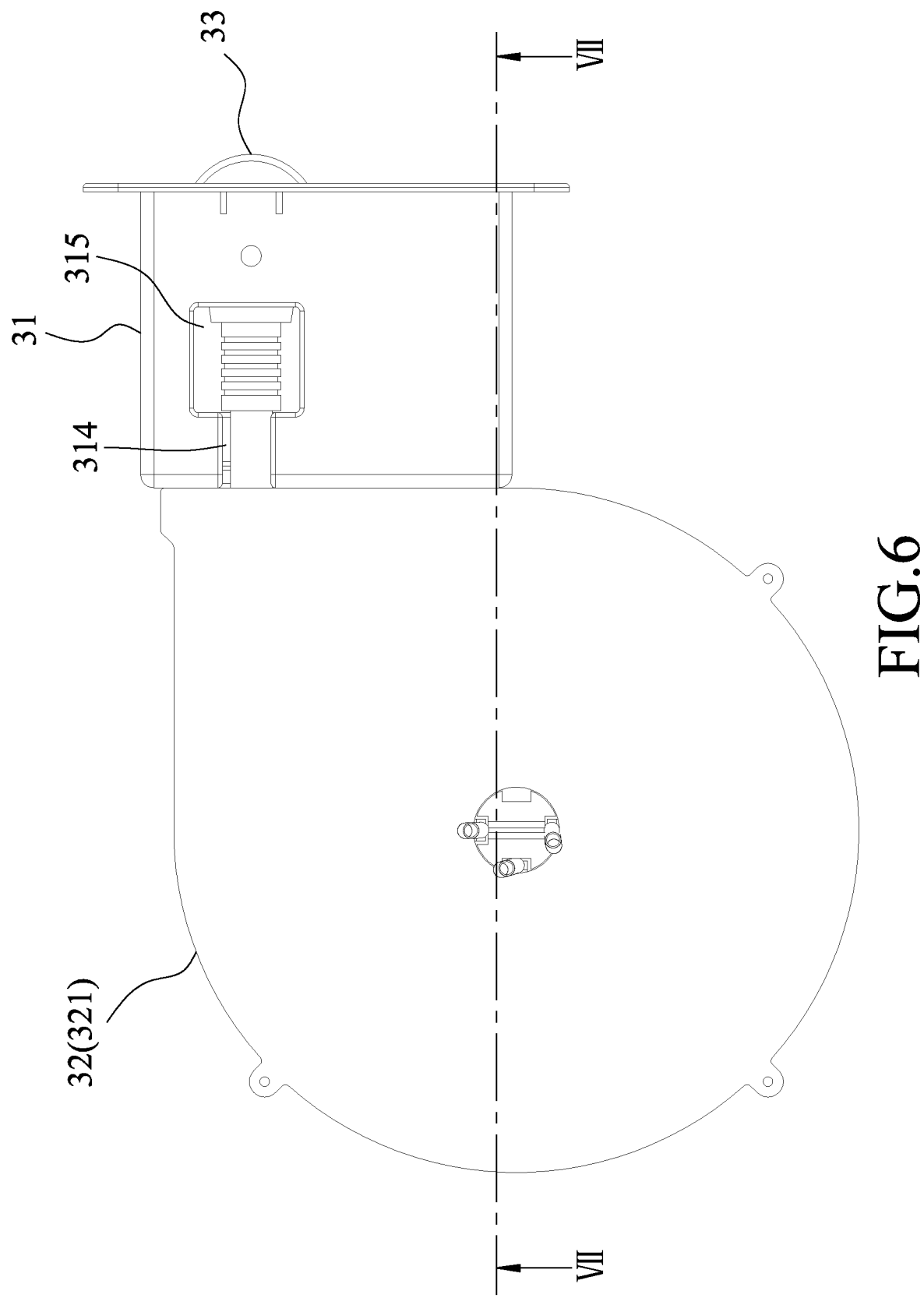
FIG. 6 is a top view illustrating the input device of the first embodiment.
Figure 7:
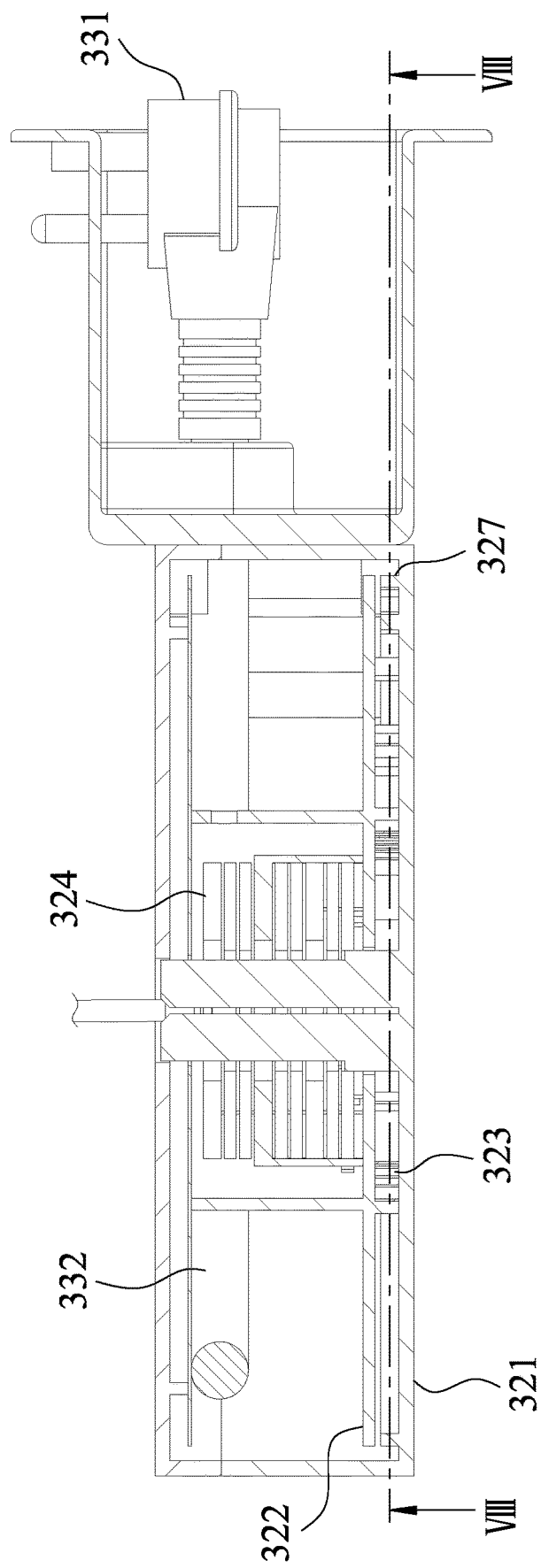
FIG. 7 is a sectional view taken along line VII-VII in FIG. 6.

Referring to FIGS. 2, 3 and 4, the cabinet body 1 includes two side members 11 that are spaced apart from each other along a first horizontal direction (D1). Each of the side members 11 has an outer side portion 111, front and back end portions 112, 113, and an inner side portion 114. The outer side portion 111 is perpendicular to the first horizontal direction (D1). The front and back end portions 112, 113 are spaced apart from each other along a second horizontal direction (D2) perpendicular to the first horizontal direction (D1), and are connected respectively to two opposite ends of the outer side portion 111. The inner side portion 114 is spaced apart from the outer side portion 111 along the first horizontal direction (D1), is connected to the front and back end portions 112, 113, and cooperates with the outer side portion 111 and the front and back end portions 112, 113 to define a mounting space 110. Specifically, the side portion 114 includes two segments spaced apart from each other along the second horizontal direction (D2) and connected respectively to the front and back end portions 112, 113. The outer side portion 111 of one of the side members 11 has an external surface 115 formed with first and second openings 116, 117.

In the present embodiment, the external surface 115 is on one of the side members 11; however, in other embodiments of the disclosure, the external surface 115 may be a whole external surface of the cabinet body 1 and the first and second openings 116, 117 may be formed in different sides of the cabinet body 1.

The storage members 2 are disposed in the cabinet body 1. In the present embodiment, each of the storage members 2 is a drawer and is slidable along the second horizontal direction (D2). The storage members 2 are disposed between the inner side portions 114 of the side members 11. One of the storage members 2 is a wide drawer having opposite lateral ends connected respectively to the inner side portions 114 of the side members 11, and the remainders of the storage members 2 are divided into two groups. The storage members 2 of each group are spaced apart along a vertical direction (D3) perpendicular to the first and second horizontal direction (D1, D2).

Referring to FIGS. 2, 3 and 4, the input device 3 is disposed between a vertically-adjacent pair of the storage members 2, and includes a fixing member 31, a cord winder 32 and a power cord 33.

The fixing member 31 engages the first opening 116, and has outer and inner walls 311, 313, and a surrounding wall 312. The outer wall 311 is fixedly connected to the external surface 115 and surrounds the first opening 116. The inner wall 313 is disposed in the cabinet body 1, is spaced apart from the inner wall 311 in the first horizontal direction (D1), and is formed with a through hole 314. The surrounding wall 312 interconnects the outer and inner walls 311, 313, and cooperates with the inner wall 313 to define a retaining groove 310 that is in spatial communication with the through hole 314. A top end of the surrounding wall 312 is formed with a top hole 315 that is spatially communicated with the through hole 314 and the retaining groove 310.

Referring to FIGS. 5 to 8, the cord winder 32 includes a hollow casing 321, a rotating seat 322, a resilient member 323, a connecting base 324, a flipping member 325, a springy member 326, and a stopping member 327.

The casing 321 is disposed in the cabinet body 1, is spaced apart from the storage members 2, is mounted to the inner wall 313 of the fixing member 31, and has a cord hole that is in spatial communication with the first opening 116 via the through hole 314 in the inner wall 313. The rotating seat 322 is mounted in the casing 321 and is rotatable about an axis (L). The resilient member 323 is connected between the casing 321 and the rotating seat 322. The connecting base 324 is mounted at a center of the rotating seat 322 and is electrically connected to the power cord 33. The flipping member 325 is movably connected to the rotating seat 322, is co-rotatable with the rotating seat 322 about the axis (L), and is rotatable upon itself about a moving axis. The springy member 326 is connected to the rotating seat 322 and abuts against the flipping member 325. The stopping member 327 is mounted in the casing 321 and is spaced apart from the rotating seat 322.

It should be noted that, in other embodiments of the disclosure, configurations of the cord winder 32 may vary.

The power cord 33 has a plug portion 331 and a cord portion 332. The plug portion 331 is exposed from the first opening 116 of the external surface 115 and is disposed at a side of the through hole 314 opposite to the casing 321. The size of the through hole 314 is specifically designed such that the through hole 314 is impassable to the plug portion 331 and that the plug portion 331 is retained at the side of the through hole 314. The cord portion 332 extends through the cord hole of the casing 321 and the through hole 314 of the fixing member, is connected between the rotating seat 322 of the cord winder 32 and the plug portion 331, and is wound about the axis (L) onto the rotating seat 322 of the cord winder 32.

Figure 8:
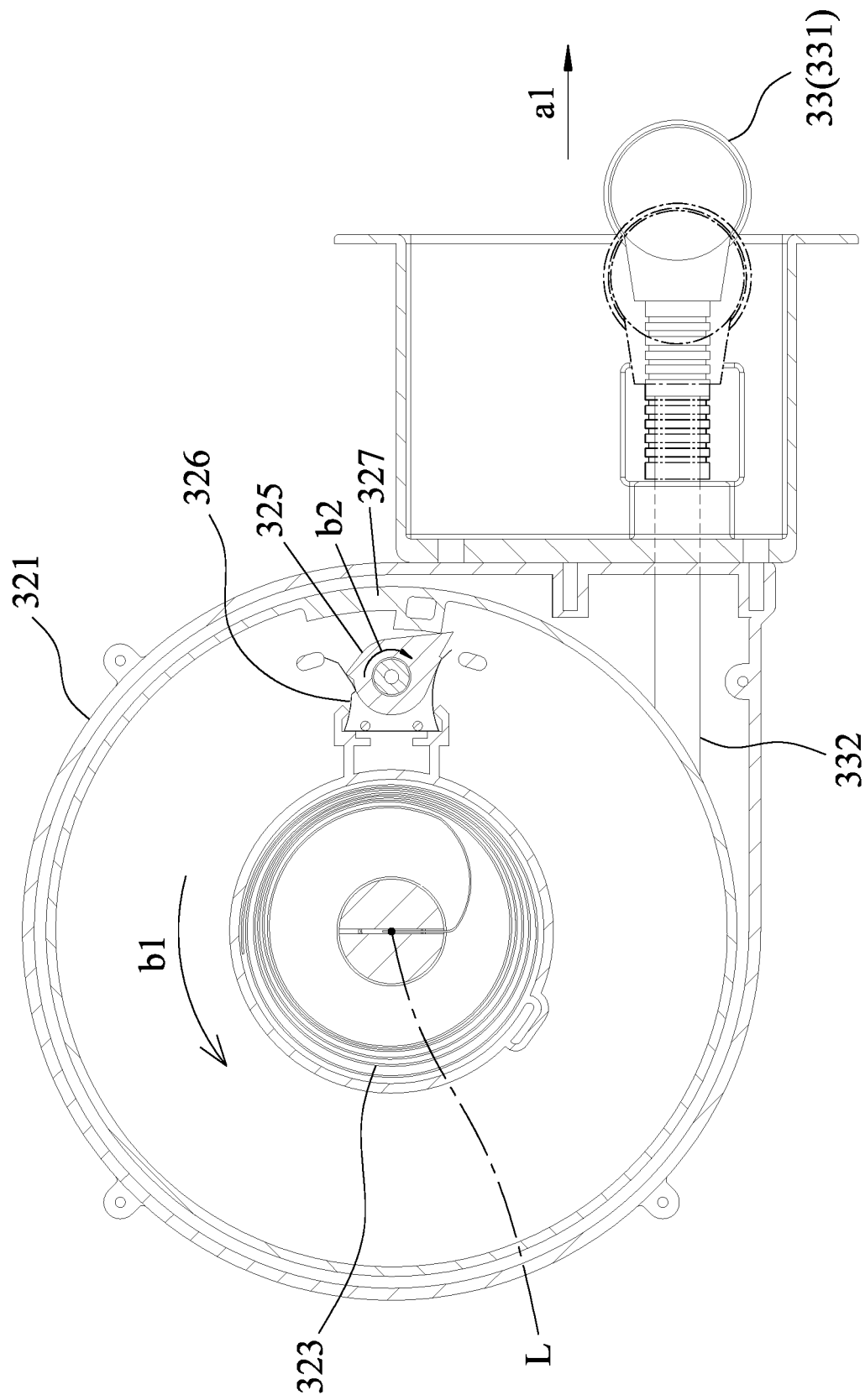
FIG. 8 is a sectional view taken along line VIII-VIII in FIG. 7, illustrating a plug portion of a power cord being converted from a retracted position to a non-retracted position.
Figure 9:
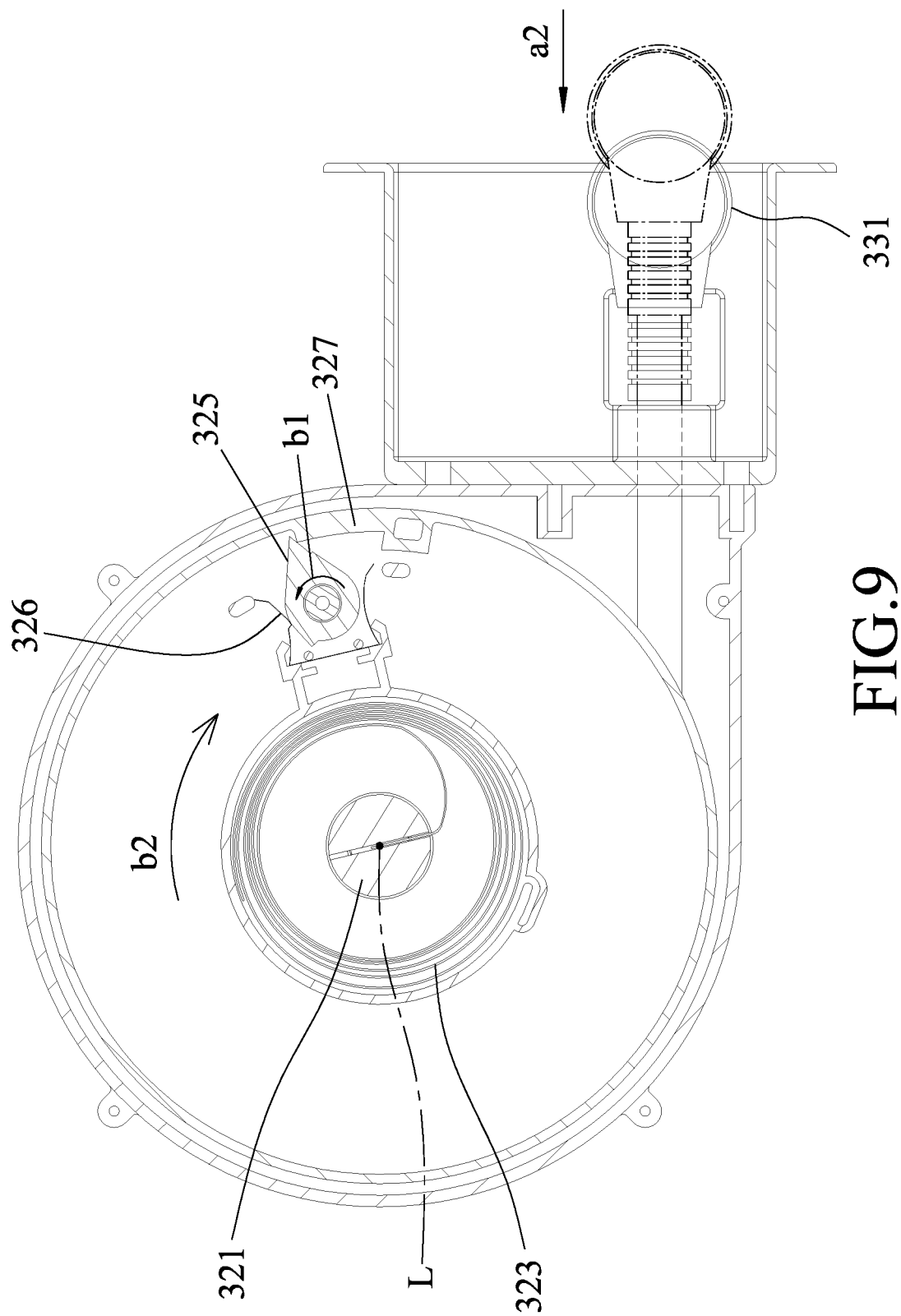
FIG. 9 is another sectional view similar to FIG. 8, illustrating the plug portion being converted from the non-retracted position to the retracted position.

Referring to FIGS. 8 and 9, the plug portion 331 of the power cord 33 is movable between a retracted position, where the plug portion 331 is retained in the retaining groove 310 and the cord portion 332 is wound about the axis (L) onto the rotating seat 322, and a non-retracted position, where at least a portion of the cord portion 332 of the power cord 33 is unwound from the rotating seat 322 and is pulled out of the first opening 116 via the cord hole of the casing 321.

As shown in FIG. 8, to be converted from the retracted position to the non-retracted position, the plug portion 331 is pulled out in an outward direction (a1) by an external force, thereby unwinding the cord portion 332 of the power cord 33, driving the rotating seat 322 to rotate about the axis (L) in a first rotational direction (b1), and resulting in a deformation of the resilient member 323. At the same time, as the flipping member 325 co-rotates with the rotating seat 322 about the axis (L) and hits the stopping member 327, the flipping member 325 is driven to rotate upon itself in a second rotational direction (b2) which is opposite to the first rotational direction (b1) such that the flipping member 325 moves past the stopping member 327 without being stopped thereby. When the plug portion 31 is at the non-retracted position, a potential energy is stored in the deformed resilient member 323 for biasing the plug portion 331 toward the retracted position.

On the other hand, as shown in FIG. 9, when the external force disappears or becomes smaller than a biasing force resulting from the potential energy of the resilient member 323, the resilient member 323 is able to drive the rotating seat 322 to rotate about the axis (L) in the second rotational direction (b2), thereby winding the cord portion 332 of the power cord 33 onto the rotating seat 322 and pulling the plug portion 331 of the power cable 33 in an inward direction (a2). Meanwhile, as the flipping member 325 co-rotates with the rotating seat 322 about the axis (L) and hits the stopping member 327, the flipping member 325 may be stopped by the stopping member 327 in cases that a force of impact is relatively small (e.g. some of the external force still persists or the flipping member 325 is relatively close to the stopping member 327 when the external force disappears), or may rotate upon itself in the first rotational direction (b1) to move past the stopping member 327 in other cases that the force of impact is relatively large (e.g. the flipping member 325 is relatively distant from the stopping member 327 when the external force disappears). In the latter cases, the flipping member 325 keeps co-rotating with the rotating seat 322 without being stopped until the plug portion 31 is back to the retracted position.

Referring to FIGS. 3 and 4, the output device 4 includes a power strip 41 and a securing unit 42.

The power strip 41 is disposed in the mounting space 110 of the one side member 11 that is formed with the second opening 117, is electrically connected to the power cord 33 via the connecting base 324 of the cord winder 32, and has a plurality of sockets 411.

The securing unit 42 includes a receiving seat 421, a cover plate 422, and two L-shaped securing members 423. The receiving seat 421 engages the second opening 117, and has two side portions 424 and an inner portion 425. The side portions 424 abut against the external surface 115 of the cabinet body 1 and are disposed respectively at two opposite sides of the second opening 117. The inner portion 425 interconnects the side portions 424, extends into the cabinet body 1 via the second opening 117, and defines a receiving groove 420 that receives the power strip 41 therein. The cover plate 422 covers the side portions 424 of the receiving seat 421, cooperates with the external surface 115 of the cabinet body 1 to fixedly clamp the side portions 424 therebetween, and is formed with an output opening 427. The output opening 427 is spatially communicated with the receiving groove 420 and the size of the output opening 427 is specifically designed such that the output opening 427 is impassable to the power strip 41 and that the power strip 41 is confined in the receiving groove 420. The sockets 411 of the power strip 41 are exposed from the output opening 427 through the second opening 117 of the external surface 115. The inner portion 425 of the receiving seat 421 is formed with two linking holes 426. The securing members 423 respectively engage with the linking holes 426 and fixedly interconnect the receiving seat 421 and the power strip 41. In other embodiments of the disclosure, quantities of the securing member 423 and the linking hole 426 may not be limited to two.

To utilize the input and output devices 3, 4 of the tool cabinet of the disclosure in a working environment, a user may pull out the plug portion 331 of the power cord 33 from the retracted position and plug the plug portion 331 into any local power outlet such as a wall socket, so that the user may operate a desired power tool by connecting it to one of the sockets 411 of the power strip 41. When a working process is finished, the user may first disconnect the power tool from the power strip 41, next unplug the plug portion 331 from the wall socket, and finally pull the power cord 33 to actuate the cord winder 32 to retract the power cord 33 back to the cord winder 32.

In summary of the abovementioned description, advantages of the disclosure are concluded as follows:
1. By virtue of the cord winder 32 being disposed in the cabinet body 1 and the power cord 33 being retractable to the cord winder 32, the working environment is kept clear of extension cord clutter.
2. By virtue of the abovementioned disposition of the cord winder 32 and the storage members 2, an inner space of the cabinet body 1 is used efficiently space-wise.
3. By virtue of configurations of the input and output devices 3, 4, the tool cabinet has a neat appearance without multiple parts thereof protruding out of the external surface 115.

Figure 10:
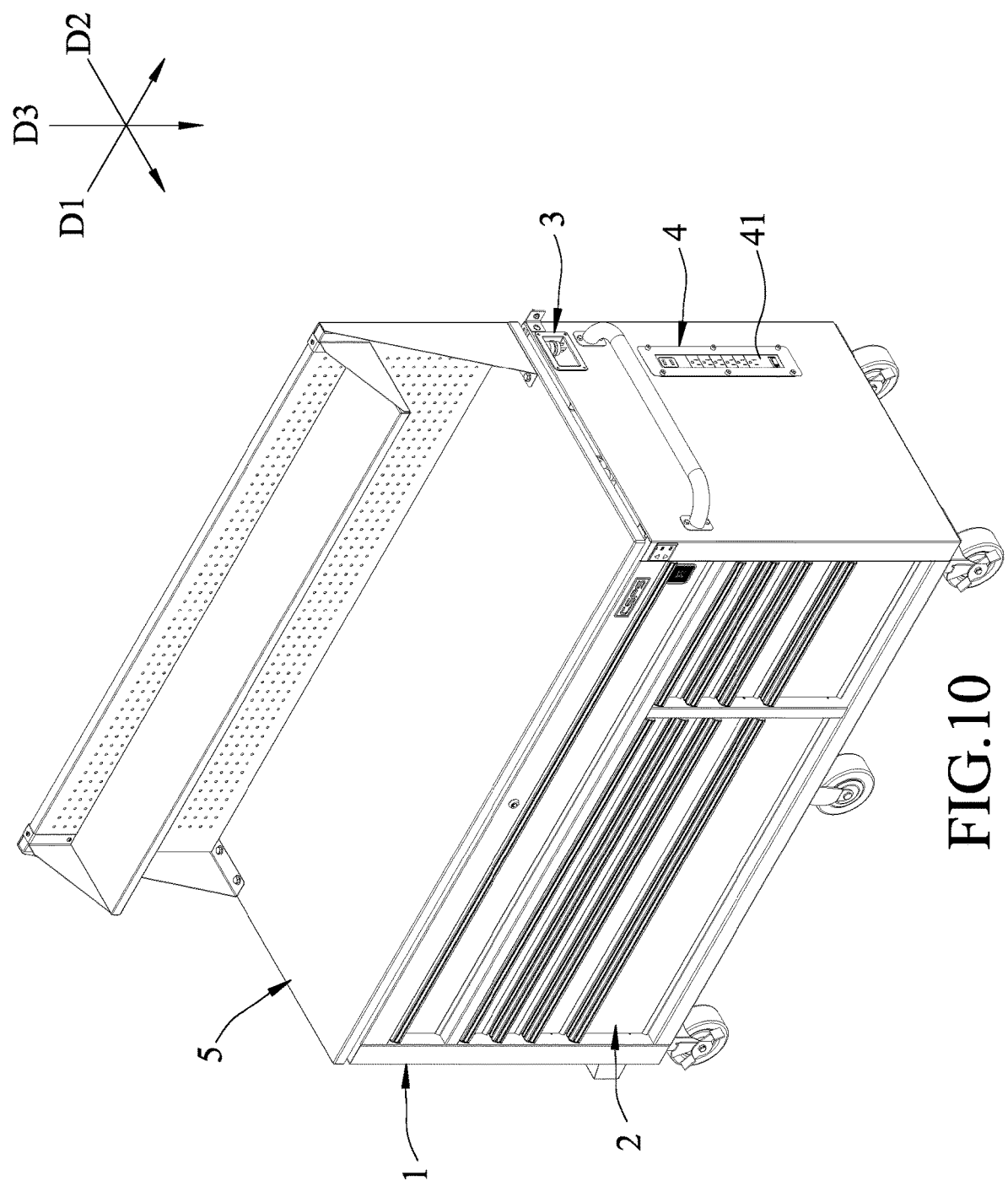
FIG. 10 is a perspective view of a second embodiment of the tool cabinet according to the present disclosure.
Figure 11:
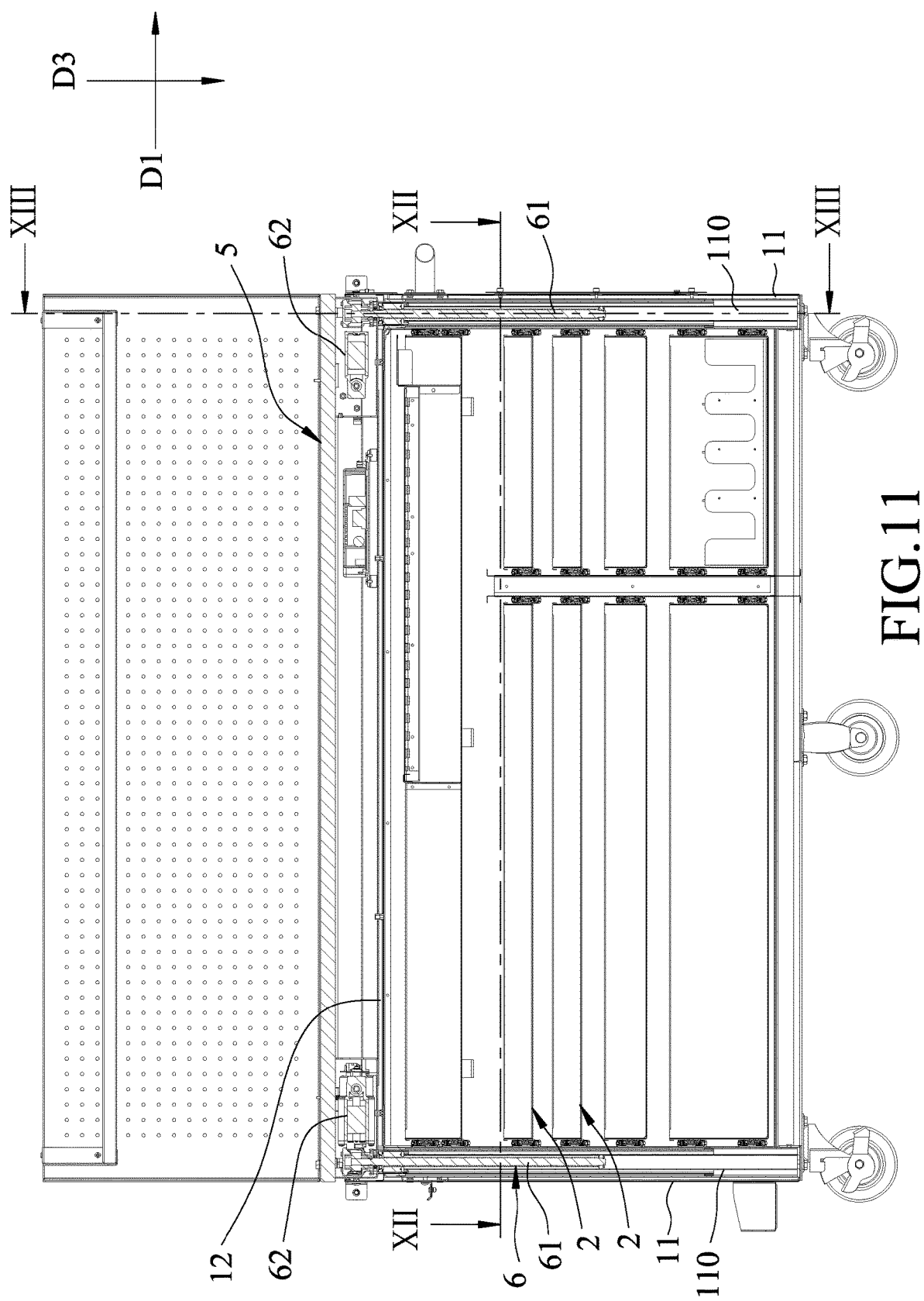
FIG. 11 is a sectional front view of the second embodiment.

Referring to FIGS. 10 to 13, a second embodiment of the tool cabinet according to the present disclosure is similar to the first embodiment and the difference therebetween is described as follows:

Referring to FIGS. 10 and 11, the tool cabinet of the second embodiment further includes a working platform 5 and a lifting device 6.

The working platform 5 is disposed above the cabinet body 1. The lifting device 6 includes two rod mechanisms 61 and two driving mechanisms 62. The rod mechanisms 61 are mounted respectively to two opposite ends of the working platform 5 along the first horizontal direction (D1). Each of the rod mechanisms 61 extends along the vertical direction (D3), is inserted into the mounting space 110 of a respective one of the side members 11, and is telescopically convertible. The two driving mechanisms 62 are respectively connected to the two rod mechanisms 61, are mounted to a bottom end of the working platform 5, are electrically connected to the input device 3, and are operable for driving telescopic conversion of the rod mechanisms 61, thereby raising or lowering the working platform 5.

In the present embodiment, the rod mechanisms 61 include threaded rods and nuts that are engaged with the threaded rods. The driving mechanisms 62 include motors for driving rotary and linear movements of the threaded rods relative to the nuts. In other embodiments of the disclosure, quantity of the driving mechanism 62 may be one, and the driving mechanism 62 is electrically connected to one of the rod mechanisms 61.

Figure 12:
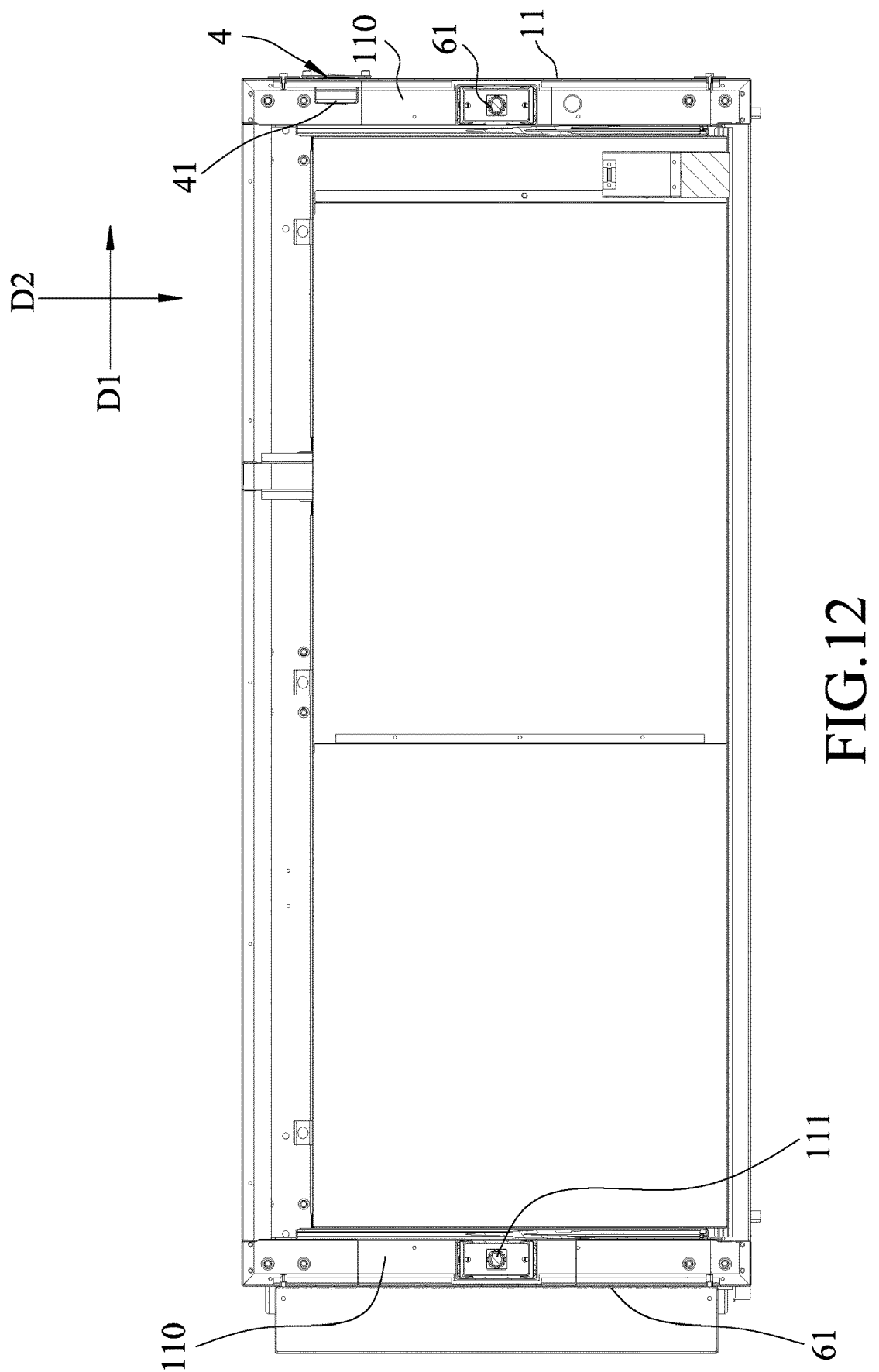
FIG. 12 is sectional view taken along line XII-XII in FIG. 11.

Referring to FIGS. 10 and 12, in the present embodiment, the power strip 41 of the output device 4 is elongated, extends along the vertical direction (D3), and is spaced apart from a respective one of the rod mechanisms 61 which is inserted into the respective one of the side members 11.

Figure 13:
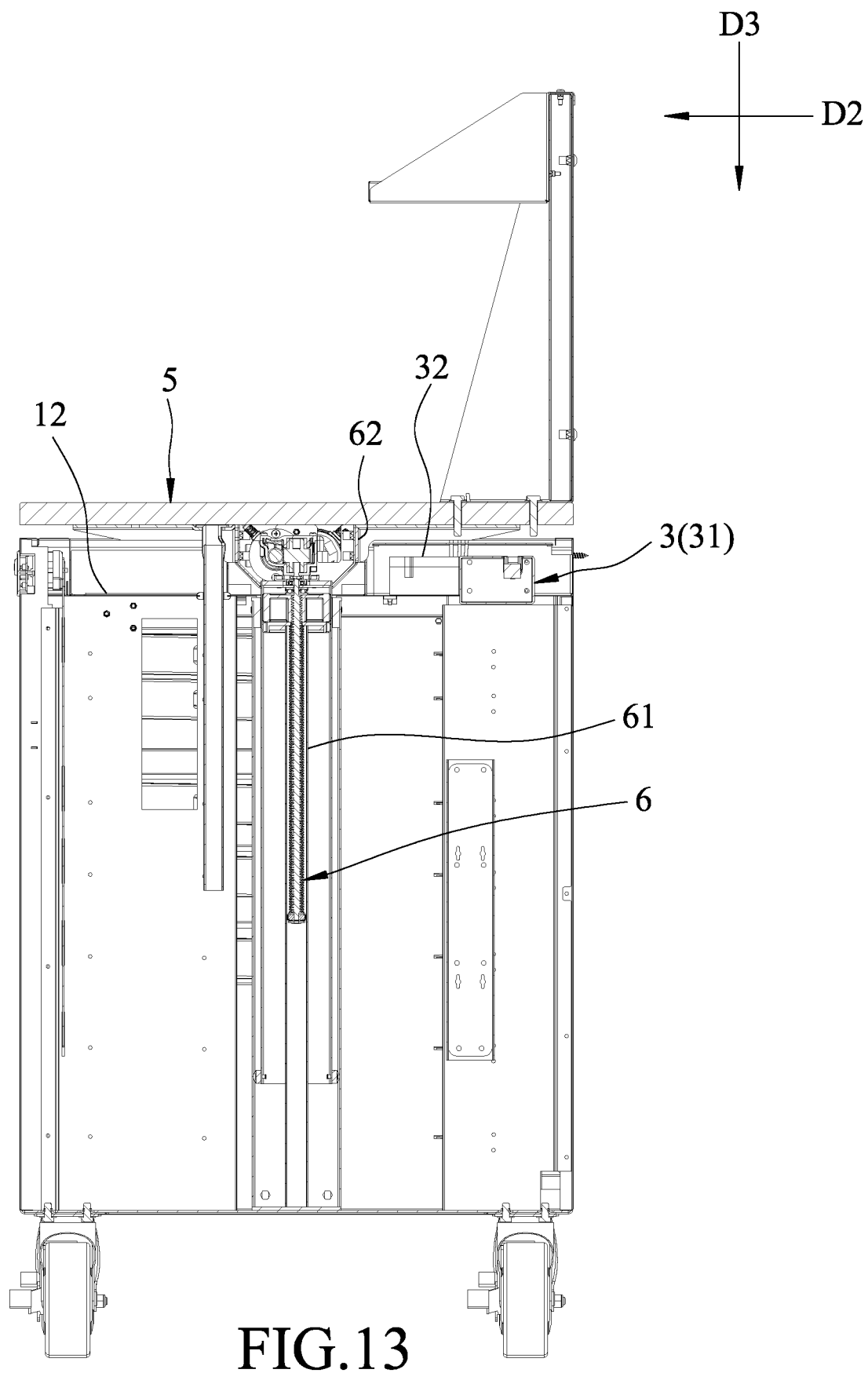
FIG. 13 is sectional view taken along line XIII-XIII in FIG. 11.

Referring to FIGS. 11 and 13, in the present embodiment, the cabinet body 1 further includes a top member 12 connected between the side members 11. The storage members 2 are disposed under the top member 12. When the working platform 5 is at a lowest position, the working platform 5 is spaced apart from the top member 12 along the vertical direction (D3), and the input device 3 is disposed between the top member 12 and the working platform 5.

Since configurations of the tool cabinet of the second embodiment are similar to that of the first embodiment, the second embodiment also has the abovementioned advantages. Moreover, the second embodiment provides the user with the working platform that is height-adjustable with powered driving mechanism 62.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:
1. A tool cabinet comprising:
   a cabinet body having an external surface that is formed with first and second openings;
   a plurality of storage members disposed in said cabinet body;
   an input device including
      a cord winder that includes
         a hollow casing disposed in said cabinet body, spaced apart from said storage members, and having a cord hole that is in spatial communication with said first opening,
a rotating seat mounted in said casing and being rotatable about an axis, and
a resilient member connected between said casing and said rotating seat, and
a power cord that has
a plug portion exposed from said first opening of said external surface, and
a cord portion connected between said rotating seat of said cord winder and said plug portion, and wound about the axis onto said rotating seat of said cord winder; and
an output device including a power strip that is disposed in said cabinet body, that is electrically connected to said power cord, and that has a plurality of sockets exposed from said second opening of said external surface;
wherein said plug portion of said power cord is movable between a retracted position, where said plug portion is retracted in said cabinet body, and a non-retracted position, where at least a portion of said cord portion of said power cord is unwound from said rotating seat and is pulled out of said first opening via said cord hole of said casing;
wherein said resilient member is disposed for biasing said plug portion toward the retracted position; and
wherein said output device further includes a securing unit that includes
a receiving seat engaging said second opening, and having
two side portions which abut against said external surface of said cabinet body and which are disposed respectively at two opposite sides of said second opening, and
an inner portion which interconnects said side portions, which extends into said cabinet body via said second opening, and which defines a receiving groove receiving said power strip therein, and
a cover plate covering said side portions of said receiving seat, cooperating with said external surface of said cabinet body to fixedly clamp said side portions therebetween, and formed with an output opening which spatially communicates with said receiving groove and which is impassable to said power strip such that said power strip is confined in said receiving groove, said sockets being exposed from said output opening.

2. The tool cabinet as claimed in claim 1, wherein:
said input device further includes a fixing member that engages said first opening, that is mounted with said casing of said cord winder, and that is formed with a through hole spatially communicating with said cord hole of said casing and said first opening;
said cord portion of said power cord extends through said cord hole and said through hole; and
said plug portion of said power cord is disposed at a side of said through hole opposite to said casing; and
said through hole is impassable to said plug portion such that said plug portion is retained at the side of said through hole.

3. The tool cabinet as claimed in claim 2, wherein said fixing member of said input device has:
an outer wall that is fixedly connected to said external surface and that surrounds said first opening;
an inner wall that is formed with said through hole, and that is connected to said casing of said input device; and
a surrounding wall that interconnects said outer and inner walls, and that cooperates with said inner wall to define a retaining groove which receives said plug portion of said power cord when said plug portion is at the retracted position.

4. The tool cabinet as claimed in claim 1, wherein:
said securing unit of said output device further includes at least one L-shaped securing member connected to said power strip; and
said receiving seat of said securing unit is formed with a linking hole engaged with said at least one securing member.

5. The tool cabinet as claimed in claim 1, wherein:
said cabinet body includes two side members that are spaced apart from each other along a first horizontal direction, each having an outer side portion that is perpendicular to the first horizontal direction, front and back end portions that are spaced apart from each other along a second horizontal direction perpendicular to the first horizontal direction, and that are connected respectively to two opposite ends of said outer side portion, and
an inner side portion that is spaced apart from said outer side portion along the first horizontal direction, that is connected to said front and back end portions, and that cooperates with said outer side portion and said front and back end portions to define a mounting space;
said outer side portion of one of said side members has said external surface;
said power strip of said output device is disposed in said mounting space of the one of said side members; and
said storage members are disposed between said inner side portions of said side members.

6. The tool cabinet as claimed in claim 5, further comprising:
a working platform disposed above said cabinet body; and
a lifting device including two rod mechanisms that are mounted respectively to two opposite ends of said working platform along the first horizontal direction, each of said rod mechanisms extending along a vertical direction which is perpendicular to the first and second horizontal directions, being inserted into said mounting space of a respective one of said side members, and being telescopically convertible, and
at least one driving mechanism that is connected to one of said rod mechanisms, that is mounted to a bottom end of said working platform, and that is operable for driving telescopic conversion of said rod mechanisms, thereby raising or lowering said working platform; and
wherein said power strip of said output device is elongated, extends along the vertical direction, and is spaced apart from a respective one of said rod mechanisms which is inserted into the respective one of said side members.

7. The tool cabinet as claimed in claim 6, wherein said at least one driving mechanism is electrically connected to said input device.

8. The tool cabinet as claimed in claim 6, wherein:
said cabinet body further includes a top member connected between said side members;
said storage members are disposed under said top member; and
when said working platform is at a lowest position, said working platform is spaced apart from said top member along the vertical direction, and said input device is disposed between said top member and said working platform.

9. The tool cabinet as claimed in claim 1, wherein:
each of said storage members is a drawer and is slidable along a horizontal direction;
one of said storage members is spaced apart from another one of said storage members along a vertical direction perpendicular to the horizontal direction; and
said input device is disposed between an adjacent pair of said storage members.

\* \* \* \* \*